United States Patent [19]
Bouillon et al.

[11] Patent Number: 5,486,379
[45] Date of Patent: Jan. 23, 1996

[54] METHOD OF MANUFACTURING A PART MADE OF COMPOSITE MATERIAL COMPRISING FIBER REINFORCEMENT CONSOLIDATED BY A LIQUID PROCESS

[75] Inventors: Eric Bouillon, Talence; Jean-Luc Leluan, Bordeaux; Eric Lavasserie, Begles, all of France

[73] Assignee: Societe Europeenne de Propulsion, Suresnes, France

[21] Appl. No.: 269,551

[22] Filed: Jul. 1, 1994

[30] Foreign Application Priority Data

Jul. 5, 1993 [FR] France ................................ 93 08177

[51] Int. Cl.$^6$ .................................................. B05D 7/00
[52] U.S. Cl. .......................... 427/212; 427/220; 427/221; 264/29.4; 264/29.5; 264/29.6; 264/60; 264/62; 264/65; 264/81; 264/129; 264/134; 264/263
[58] Field of Search ...................... 427/212, 220, 427/221, 385.5; 264/29.4, 29.5, 29.6, 62, 65, 60, 81, 129, 263, 134

[56] References Cited

U.S. PATENT DOCUMENTS

| | | | |
|---|---|---|---|
| 5,290,491 | 3/1994 | Heraud et al. | 264/29.4 |
| 5,336,522 | 8/1994 | Balhadere et al. | 427/226 |

FOREIGN PATENT DOCUMENTS

| | | |
|---|---|---|
| 0451043 | 10/1991 | European Pat. Off. . |
| 0495570 | 7/1992 | European Pat. Off. . |
| WO9200182 | 1/1992 | WIPO . |

*Primary Examiner*—Shrive Beck
*Assistant Examiner*—David M. Maiorana
*Attorney, Agent, or Firm*—Weingarten, Schurgin, Gagnebin & Hayes

[57] ABSTRACT

A fiber preform constituting the fiber reinforcement of the part to be made is itself made by shaping and consolidating a fiber fabric by a liquid process. An interphase layer between the fibers and the matrix is formed on the consolidated preform prior to densification thereof with the matrix, such that the operation of densifying the consolidated preform can be performed without requiring supporting tooling therefor.

7 Claims, 2 Drawing Sheets

METHOD OF MANUFACTURING A PART MADE OF COMPOSITE MATERIAL COMPRISING FIBER REINFORCEMENT CONSOLIDATED BY A LIQUID PROCESS

The present invention relates to a method of manufacturing a part made of composite material comprising fiber reinforcement densified by a matrix.

BACKGROUND OF THE INVENTION

The field of application of the invention is more particularly that of thermostructural composite materials, i.e. composite materials having mechanical properties that make them suitable for constituting structural elements and that are capable of conserving those properties up to high temperatures in use. Typical thermostructural composite materials are carbon-carbon (C-C) composites and carbon matrix composites (CMCs) in which the fiber reinforcement comprises refractory fibers made of carbon or of ceramic.

The manufacture of a part made of thermostructural composite material generally comprises making a fiber preform whose shape is close to that of the part that is to be manufactured, and then densifying the preform with the matrix.

The fiber preform constitutes the reinforcement of the part and its function is essential for the mechanical properties thereof. The preform is obtained from fiber fabrics: threads, cordage, braids, pieces of cloth, felts, etc. . . . Shaping is performed by winding, weaving, stacking, and optionally needling together two-dimensional plies of cloth or sheets of cables, etc. . . .

The fiber preform is densified by filling the voids throughout the volume of the preform with the material that constitutes the matrix.

A first densification technique (liquid process) consists in impregnating the preform with a liquid composition that contains a precursor of the matrix material and then, possibly after drying and polymerization, in subjecting the impregnated preform to some kind of treatment, generally heat treatment, for transforming the precursor. Several consecutive cycles going from impregnation to heat treatment are usually required to achieve the desired degree of densification.

A second densification technique (gas process) consists in performing chemical vapor infiltration of the matrix-constituting material into the preform. To this end, the preform is placed in an infiltration oven into which a gas is admitted. Under determined conditions of temperature and pressure, the gas penetrates to the core of the preform and, on making contact with the fibers, the matrix-constituting material is formed by decomposition of the gas or by a reaction between components of the gas.

To keep the preform in the desired shape while chemical vapor infiltration is taking place, it is common practice, at least during a first portion of the densification process, to hold the preform in tooling that is generally made of graphite. Such bulky tooling is expensive to make, particularly when the preform is complex in shape. It also requires a large number of holes to be machined so as to give the gas access to the preform through the tooling. In addition, the tooling is fragile, heavy, and cumbersome.

Now, chemical vapor infiltration is a process that is often lengthy and expensive. The presence of tooling occupying a significant fraction of the working volume of the infiltration oven and presenting a large amount of thermal inertia is penalizing. In addition, matrix material is inevitably deposited on the tooling, thereby giving rise to a non-negligible quantity of rejects due to adhesion between the preform and the tooling and, in any event, to changes of dimensions that prevent the tooling being reused directly. Thus, under the best of circumstances, such deposits require the tooling to be renovated frequently.

The presence of tooling during chemical vapor infiltration is necessary only until the preform has been consolidated. This stage is reached when the material constituting the matrix has been deposited in sufficient quantity to bind together the fibers throughout the volume of the preform so that, after the tooling has been removed, the preform remains in the desired shape and can be handled. Densification of the preform can then be finished off without tooling. Nevertheless, tooling remains necessary at least during a part of the infiltration process, and, after consolidation, the process must be interrupted in order to enable the tooling to be withdrawn.

It is therefore desirable to be able to perform the entire chemical vapor infiltration process without it being necessary to hold the preform in tooling.

To this end, U.S. Pat. NO. 08/013,816 of Feb. 2, 1993, now U.S. Pat. No. 5,336,522, proposes consolidating the preform by a liquid process. The fiber fabric constituting the preform is impregnated by a precursor of the matrix, and is then shaped by means of tooling (mold or shaper). Thereafter, the precursor, possibly after drying and polymerization, is transformed by heat treatment so as to leave behind a solid residue that serves to consolidate the preform.

For thermostructural composite materials, and in particular CMCs, a considerable improvement in resistance to shocks and to cracking is obtained by forming an appropriate matching layer or "interphase" on the fibers of the fiber reinforcement prior to densification. The interphase-constituting material is selected to change the propagation mode of cracks so that cracks propagating through the matrix do not reach the fibers and pass through them thereby degrading the mechanical properties of the material. Reference may be made, for example, to U.S. Pat. No. 5,026,604 which describes the use of chemical vapor infiltration to form interphases made of pyrolytic carbon or of boron nitride.

When the preform is being consolidated by a liquid process in order to avoid the need for tooling during chemical vapor infiltration, it is necessary either to form the interphase on the fiber texture while it is not being held in shape by tooling, or else to use fibers that have previously been coated with an interphase layer prior to making the preform.

However, the presence of the interphase stiffens the fiber fabric, thus giving rise to difficulties in shaping the preform, particularly if the shape of the preform is complex. In order to conserve sufficient capacity for deformation, it is necessary to limit the thickness of the interphase, thereby increasing the risk of the interphase being damaged by deformation of the fabric. However, if the interphase is to perform its function effectively, it is essential for it to cover the fibers of the preform in a manner that is continuous and uniform.

OBJECTS AND SUMMARY OF THE INVENTION

An object of the present invention is to propose a method of manufacturing a part made of composite material in which both an interphase can be formed and densification by chemical vapor infiltration can be achieved without requiring tooling, without any limit being imposed on the thickness of the interphase or on the amount of deformation that can be applied to the fiber fabric in order to make the preform.

According to the invention, this object is achieved by a method of manufacturing a part made of composite material comprising fiber reinforcement densified by a matrix, the method comprising the steps of making a fiber preform constituting the fiber reinforcement of the part to be manufactured, forming an interphase layer, and densification by means of a matrix, in which method the preform is made by shaping and consolidating a fiber fabric by a liquid process, and the interphase layer is formed on the consolidated preform such that densification of the consolidated preform can be performed without requiring supporting tooling.

It has been found that when the interphase is made after consolidation of the preform by a liquid process, the resulting part made of composite material has mechanical properties that are similar to those of parts made of composite material and in which the interphase is made directly on the fibers prior to densification by the matrix, which properties are a great deal better than those of parts made of composite material in which the preform is consolidated by a liquid process and is then densified without any intermediate deposition of an interphase. It has thus been shown that it is not necessary to make the interphase directly on bare fibers in order to achieve good mechanical properties.

Such a result is obtained without requiring support tooling, particularly when densifying the preform by chemical vapor infiltration. This constitutes a considerable advantage over prior art methods in which such tooling is essential during infiltration, even if only while consolidating the preform. As emphasized at the beginning of the description, support tooling is expensive, fragile, and bulky, and represents a large part of the high cost of infiltration operations.

DESCRIPTION OF THE DRAWINGS

The invention can be further illustrated in accompanying drawings of which.

DETAILED DESCRIPTION OF THE INVENTION

Figure 1:
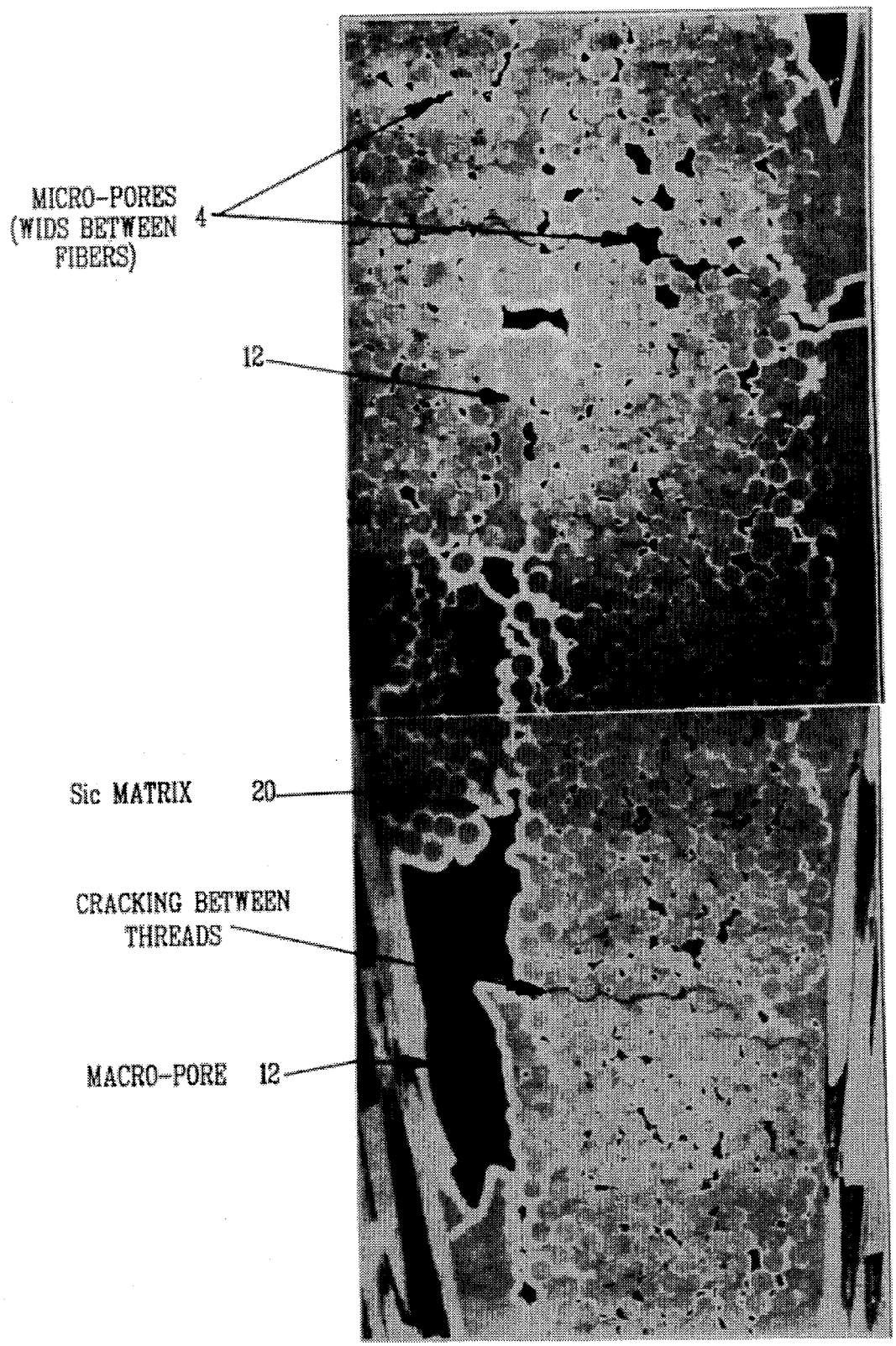
FIG. 1 is a 200 magnification micro-photograph of results of a traction test on material made according to the disclosure showing isolate point bonding of threads.

The method of the invention comprises successive steps of: preparing a reinforcing fiber fabric; shaping and consolidating the fiber fabric by a liquid process so as to obtain a consolidated preform; depositing an interphase on the consolidated preform; and densifying the preform.

The initial fiber fabric may be made of fibers of various different kinds, and in particular of carbon fibers or of ceramic fibers (e.g. silicon carbide fibers). For the purpose of shaping using a liquid process, the texture is advantageously in the form of two-dimensional plies, e.g. layers of cloth, sheets of threads or cables, webs of fibers, etc. . . . The layers of cloth may be made up of threads themselves made of filaments that are continuous or discontinuous.

In a manner that is well known per se, consolidation by a liquid process is performed by impregnating the fiber fabric with a precursor of the material desired for the first stage of the matrix which serves to provide consolidation. It may be constituted by a resin having a high coke content (phenolic resin, epoxy resin, etc. . . . ), a carbon precursor, or ceramic precursors such as polysilanes or polysilazanes (which are precursors of silicon carbide), polycarbosilanes, or other precursors as obtained by a sol/gel process, dissolved salts, . . .

The impregnated fiber fabric is shaped by molding, then the precursor is polymerized, generally at a temperature of less than 200 °C. At this stage, the shaped fabric is subjected to heat treatment to transform the precursor. The heat treatment is performed at a temperature that generally lies in the range 500° C. to 2,800° C., depending on the nature of the precursor, with the fabric optionally being held in the mold to avoid deformation.

The interphase layer is deposited within the consolidated preform to a thickness that is sufficient for achieving the desired function of deflecting and stopping cracked propagation, while nevertheless not being so thick as to fail to leave the empty volume required for subsequent deposition of the matrix. This thickness preferably lies in the range 0.03 μm to 3 μm. The interphase layer is made of a material such as carbon, more particularly pyrolytic carbon of the rough laminar type, or boron nitride, for example. The interphase layer is preferably deposited by chemical vapor infiltration in order to ensure that its thickness is as uniform as possible, no supporting tooling being required. Nevertheless, it is also possible to envisage depositing the interphase by a liquid process. In any event, it is not necessary to hold the consolidated preform in tooling.

The matrix is densified by chemical vapor infiltration without using supporting tooling. It could also be densified using a liquid process. The material constituting the matrix may be, in particular, carbon or a ceramic, e.g. silicon carbide, silicon nitride, etc. . . . The techniques of forming such matrices using a gas process or a liquid process are well known.

Various implementations of the invention are described below by way of non-limiting indication.

EXAMPLE 1

A fiber fabric made up of bare carbon fibers (without any surface covering, i.e. after eliminating any lubrication) and woven in satin weave was impregnated with a phenolic resin and was shaped by means of a mold constituted by low temperature tooling. The phenolic resin was polymerized. The preform consolidated in this way was extracted from the tooling and the resin was carbonized so as to leave a carbon residue bonding the fibers together. Thereafter, the preform was provided with an interphase layer of pyrolyric carbon having a thickness of about 0.1 μm by means of chemical vapor infiltration. The interphase layer was made in a manner similar to that described in U.S. Pat. No. 4,748,079 for an interphase that was formed directly on the fibers of a fiber fabric. The preform as consolidated and provided with its interphase was densified by a matrix of silicon carbide obtained by chemical vapor infiltration as described in French patent application No. FR 2 401 888.

The results of traction tests on a dumbbell-shaped test piece A manufactured in this way are given in Table I (maximum breaking stress $\sigma_R$, breaking elongation $\epsilon_R$, and modulus E).

EXAMPLE 2

The procedure was the same as described in Example 1, except that the fiber fabric was made of carbon fibers provided with a surface coating and woven using plain weave.

The results of traction tests on a test piece B are given in Table I.

Figure 2:
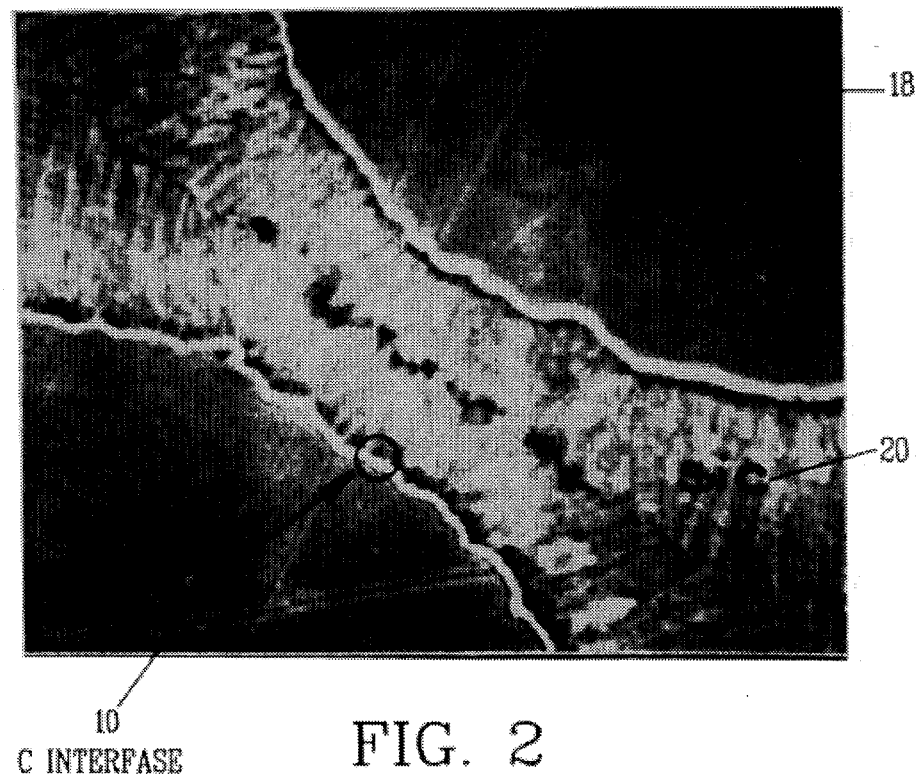
FIG. 2 is a 20,000 magnification micro-photograph of results of a traction test on material according to the disclosure showing a pyrolytic carbon interphase between a carbon fiber and a silicon carbide matrix.
Figure 3:
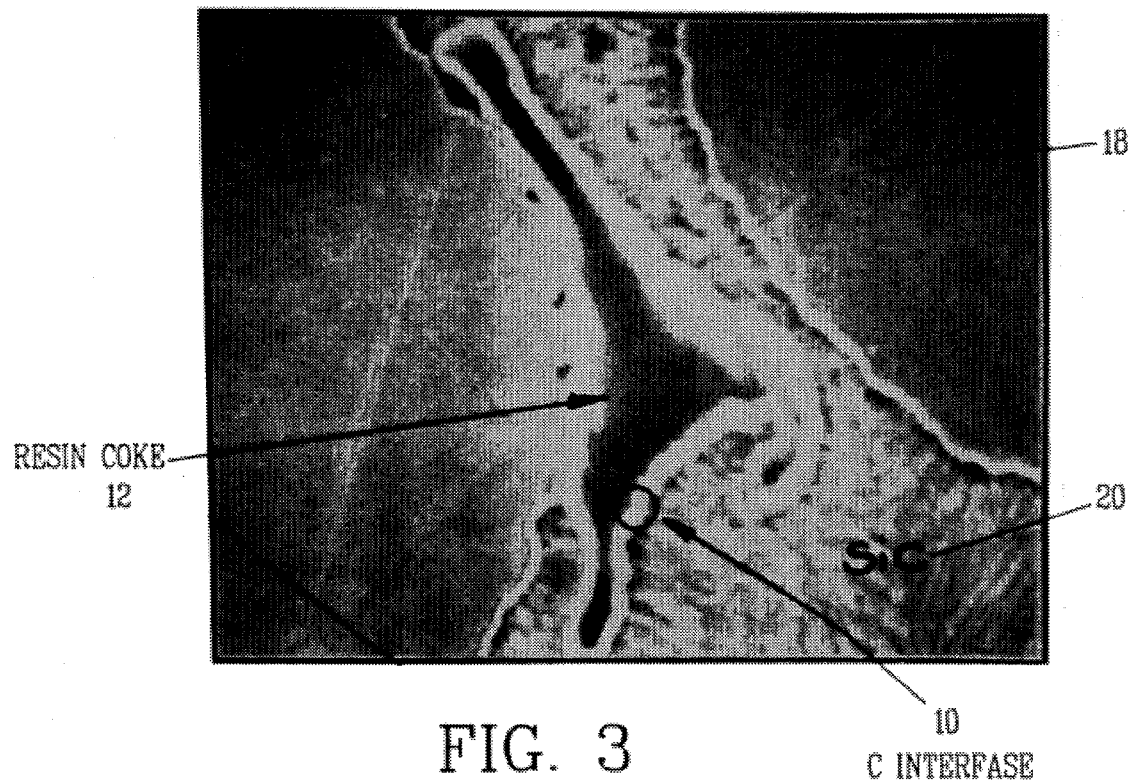
FIG. 3 is a 20,000 magnification micro-photograph illustrating discontinuous resin coke along with a pyrolytic carbon interphase encasing carbon fibers and a "block" of resin coke.

FIGS. 1 to 3 are microphotographs of the resulting material.

In FIG. 1 (magnification 200) it can be seen that the resin coke coming from carbonization of the phenolic resin bonds together the threads of the preform in a discontinuous manner, i.e. it sticks the threads together at separate points. However, the resin penetrates little inside the threads, so a large fraction of the surface of the fibers constituting the threads is left bare. As a result, during formation of the interphase by chemical vapor infiltration, pyrolyric carbon can deposit on the fibers while also encasing "blocks" of resin coke. This can be seen in FIG. 2 (magnification 20,000) showing pyrolyric carbon interphase between a carbon fiber and a silicon carbide matrix, and in FIG. 3 (magnification 20,000) where the discontinuous nature of the resin coke can be seen as can the pyrolyric carbon interphase encasing both the carbon fibers and the "block" of resin coke.

In FIGS. 1 to 3, it is the pyrocarbon interphase that appears pale and the resin coke that appears dark (with the exception of residual pores).

EXAMPLE 3

The procedure was the same as in Example 1 with a pyrolyric carbon interphase having a thickness of about 0.5 µm being formed by chemical vapor infiltration, the interphase being made in the same manner as that described in U.S. Pat. No. 5,026,604.

The results of traction tests on a test piece C are given in Table I.

EXAMPLE 4

The procedure was the same as in Example 1, except that consolidation was performed by means of polysilazane, a precursor for silicon nitride $Si_3N_4$, with the precursor being transformed by heat treatment at about 1,000° C.

The results of a traction test on a test piece D are given in Table I.

TABLE I

| Test piece | $\sigma_R$ (MPa) | $\epsilon_R$ (%) | E (GPa) |
|---|---|---|---|
| (traction test) | | | |
| A | 360 | 0.80 | 80 |
| B | 340 | 0.61 | 90 |
| C | 400 | 0.86 | 76 |
| D | 330 | 0.76 | 91 |
| E | 340 | | |
| F | 200 | | |

By way of comparison, Table I also gives the results of traction tests performed on:

a test piece E obtained using a prior art method implemented on the fiber fabric of Example 1 with a pyrolyric carbon interphase being deposited directly on the fibers and with densification being performed by chemical vapor infiltration, using supporting tooling until the preform was sufficiently consolidated; and a test piece F obtained using a method as described in Example 2, except that no interphase layer was formed.

The results obtained show clearly that the formation of an interphase, after consolidation by a liquid process, provides a very considerable improvement in the mechanical properties (comparison with test piece F), and enables properties to be achieved that are similar to those obtained by forming the interphase directly on the fibers as in the prior art.

EXAMPLE 5

A panel of C/SiC composite material constituting an external structural element of a piece designed to be subjected to considerable heating in a spaceplane was made as follows.

A plain weave cloth made of carbon fibers was impregnated with a phenolic resin, the mass of the resin representing 60% of the total mass of the impregnated cloth. The resulting impregnated cloth was very deformable and very sticky. Several layers of impregnated cloth were superposed and molded in an autoclave under a pressure of 10 bars, with the temperature being raised to 160° C., and with the shape of the tooling corresponding to the shape of the panel to be made. The percentage by mass of resin in the impregnated cloth went from 60% to 30% and the resin was polymerized. At that stage, the fiber content in the preform was 48% (i.e. the percentage of the apparent volume of the preform actually occupied by the fibers was 48%).

The preform consolidated in that way was placed in a chemical vapor infiltration oven where the polymerized resin was carbon and where the pyrolytic carbon interphase was formed by chemical vapor infiltration. The resin was carbonized during the rise in temperature that preceded pyrolytic carbon infiltration. That was done to obtain a material in which the fiber content was still 48% and the volume percentage of pyrolyric carbon was 12% (the thickness of the pyrolytic carbon interphase being about 0.5 µm). No deformation of the preform was observed relative to its consolidated state. Thereafter, densification of the material was continued by chemical vapor infiltration of a silicon carbide matrix.

The method of the invention is remarkable in that, by making an interphase on a preform that has been consolidated by a liquid process, it enables the same results in terms of mechanical properties to be obtained as can be obtained by the prior art methods in which the interphase is formed directly on bare fibers. The consolidated preform is made without requiring any supporting tooling during chemical vapor infiltration and without encountering the limitations that are imposed when the interphase is formed on the fibers of the fiber fabric prior to shaping the preform.

We claim:

1. A method of manufacturing a part made of a composite material, the method comprising the steps of:

making a consolidated fiber preform by a liquid process which includes impregnating a fiber fabric with a liquid precursor of a consolidating material, shaping the impregnated fiber fabric to a form substantially similar to that of the part to be manufactured, and transforming the precursor into said consolidating material to obtain a self-supporting fiber preform, depositing an interphase layer within said consolidated fiber preform, and densifying the consolidated fiber preform provided with said interphase layer by a matrix, whereby said deposition layer and densification step do not require the use of supporting tooling for the preform.

2. A method according to claim 1, wherein the interphase layer is formed by chemical vapor infiltration.

3. A method according to claim 1, wherein the interphase layer is formed by a liquid process.

4. A method according to claim 1, wherein the preform is densified by chemical vapor infiltration.

5. A method according to claim 1, wherein the preform is densified by a liquid process.

6. A method according to claim 1, for making a part of thermostructural composite material, wherein the preform is consolidated by impregnating the fiber fabric by means of a carbon precursor or of a ceramic precursor in the liquid state, by shaping the fiber fabric, and by transforming the precursor to carbon or a ceramic.

7. A method according to claim 1, wherein the thickness of the interphase layer lies in the range 0.03 $\mu m$ to 3 $\mu m$.

* * * * *